United States Patent Office 3,470,130
Patented Sept. 30, 1969

3,470,130
TRIFLUOROACETAMIDOPROPYL-SUBSTITUTED SILICONE RUBBER
Tse C. Wu, Waterford, N.Y., assignor to General Electric Company, a corporation of New York
No Drawing. Filed Dec. 5, 1967, Ser. No. 688,000
Int. Cl. C08g 31/24, 47/06
U.S. Cl. 260—37          6 Claims

ABSTRACT OF THE DISCLOSURE

Silicone elastomers in which from about 16 to 33 percent of the silicon atoms contain silicon-bonded trifluoroacetamidopropyl substituents have a desirable combination of solvent resistance, thermal stability and hydrolytic stability, which makes them useful in silicone rubber applications where the environment requires high temperature, high humidity and contact with solvents such as internal combustion engine fuels.

---

This invention relates to organopolysiloxanes convertible to the solid, cured, elastic state and containing silicon-bonded trifluoroacetamidopropyl radicals.

In the development of silicone rubbers, initial attention was directed to the preparation of materials of good physical properties which exhibited outstanding thermal stability. When these results were accomplished with modern silicone rubbers, it was recognized that the need existed for other properties, such as improved hydrolytic stability and improved resistance to solvents.

The present invention is based on my discovery of a new class of organopolysiloxanes of improved solvent resistance, thermal stability and hydrolytic stability, which are convertible to the solid, cured, elastic state and which comprise a polydiorganosiloxane having an intrinsic viscosity of at least about 0.75 deciliter per gram, e.g., from 0.75 to 4.0 deciliters per gram when measured in ethyl acetate at 25° C. and in which from about 16 to 33 mole percent of the siloxane units have the formula:

(1) 

and in which the remaining siloxane units have the formula:

(2) 

where R is a member selected from the class consisting of monovalent hydrocarbon radicals, halogenated monovalent hydrocarbon radicals, and cyanoalkyl radicals, at least about 90 mole percent of said R groups being methyl.

When converted into silicone rubber after being mixed with the usual fillers and organoperoxide vulcanizing agents, the resulting material has a unique combination of the properties described above. This result is unexpected in view of the fact that very similar materials, such as those in which the fluorine atoms are replaced by chlorine or hydrogen, do not exhibit satisfactory solvent resistance, hydrolytic stability, or thermal stability.

As will be observed from Formulas 1 and 2, the crux of the present invention is the presence of the silicon-bonded trifluoroacetamidopropyl radicals. As also is observed from the above formula, the polymeric materials of the present invention also contain the more conventional diorganosiloxane units defined by Formula 2.

In the diorganosiloxane units of Formula 2, the R radical can represent any of the radicals normally found in silicone elastomers, which includes radicals such as alkyl radicals, e.g., methyl, ethyl, propyl, butyl, octyl, octyldecyl, etc. radicals; aryl radicals, e.g., including both mononuclear and polynuclear aryl radicals such as, for example, phenyl, tolyl, xylyl, naphthyl, etc. radicals; aralkyl radicals, and in particular lower aralkyl radicals such as, for example, benzyl, phenylethyl, phenylbutyl, etc. radicals; cycloaliphatic radicals, but saturated and unsaturated, including, for example, cyclohexyl, cycloheptyl, cyclohexenyl, cycloheptenyl, etc. radicals; halogenated monovalent hydrocarbon radicals, including halogenated alkyl radicals, halogenated mononuclear and polynuclear aryl radicals, halogenated aralkyl radicals, such as chloromethyl, dibromoethyl, chlorophenyl, trifluorophenyl, the chlorotolyl radicals, etc.; cyanoalkyl radicals, e.g., beta-cyanoethyl, beta-cyanopropyl, gamma-cyanopropyl, etc. As mentioned above, in the preferred embodiment of my invention at least 90 percent of the radicals represented by R in Formula 2 are methyl radicals, so that the vast majority of the siloxane units within the scope of Formula 2 are dimethylsiloxane units, with other of such units being methylphenyl-, diphenyl-, methylvinyl-, phenylvinyl-, methylnaphthyl-, beta-cyanoethylmethyl-, etc. siloxane units.

The most convenient method for forming the convertible organopolysiloxanes of the present invention is by the rearrangement and condensation of the compound pentamethyl - gamma - trifluoroacetamidopropylcyclotrisiloxane, alone or with other cyclopolysiloxanes, preferably cyclotrisiloxanes, in the presence of a suitable organopolysiloxane rearrangement and condensation catalyst. The pentamethyl-gamma-trifluoroacetamidopropylcyclotrisiloxane is prepared by a series of reactions which involves first reacting N-allylfluoroacetamide with methyl hydrogen dichlorosilane to produce methyl-gamma-trifluoroacetamidopropyldichlorosilane. The dichlorosilane is then reacted with tetramethyldisiloxanediol to form the cyclotrisiloxane.

The polymerization of the pentamethyl-gamma-trifluoroacetamidopropylcyclotrisiloxane alone or with other cyclotrisiloxanes is effected by mixing the various cyclotrisiloxanes, heating them to a temperature above the melting point of the mixture, adding a catalyst, and maintaining at a temperature of from about 140 to 180° C. for times which vary from about a few minutes up to an hour or more, depending upon the particular reactants, the particular reaction temperature, and the desired final molecular weight which is measured in terms of intrinsic viscosity.

Satisfactory catalysts for the rearrangement of the cyclotrisiloxanes to high molecular weight linear polymers are the materials which have heretofore been used for this purpose and include compounds such as potassium hydroxide, cesium hydroxide, potassium naptholene, butyl lithium, and the like. In general, the amount of catalyst employed is in the range of from about 10 to 300 parts per million, based on the weight of the cyclotrisiloxanes.

While the various cyclotrisiloxanes which provide the majority of the radicals within the scope of R of Formula 2 and which are copolymerized with the pentamethyl-gama - trifluoroacetamidopropylcyclotrisiloxane are well known in the art, it is useful to name some of the more important of these materials, which include hexamethylcyclotrisiloxane, hexaphenylcyclotrisiloxane, the cyclotrisiloxane containing two diphenylsiloxane units and one dimethylsiloxane unit, the cyclotrisoloxane containing two diphenylsiloxane units, and one methylvinylsiloxane unit, the cyclotrisiloxane containing three methylvinylsiloxane units, hexaethylcyclotrisiloxane, etc. In preparing the convertible organopolysiloxanes of the present invention, the reaction mixture can contain a plurality of different cyclotrisiloxanes. But to provide the concentration of the pentamethyl - gamma - trifluoroacetamidopropyl radicals, the pentamethyl - gamma - trifluoroacetamidopropylcyclotrisiloxane is present in an amount equal to at least 50 percent of the mixture which is polymerized to the cyclopolysiloxane.

After the polymerization of the one or more cyclotrisiloxanes are completed, the resulting polymer is dissolved in a solvent such as ethyl acetate, decatalyzed by treatment with a mixture of methyl iodide and allyl bromide, then precipitated from solution with hexane, and residual solvent is stripped from the reaction mixture.

To prepare silicone rubber from the compositions of the present invention, the convertible polysiloxanes are mixed with suitable fillers, plasticizers, coloring additives, oxidation inhibitors, and other additives by milling on conventional rubber mills or by mixing in a doughmixer with the desired amount of peroxide which is to be used to crosslink the material to the solid, cured, elastic state.

The filters which can be added to the convertible organopolyisloxane are those conventionally employed for such applications and include organic fillers, such as copper phthalocyanine, and various inorganic fillers, including metal and non-metal oxides, such as oxides of aluminum, titanium, zirconium, magnesium and zinc, as well as siliceous materials such as aluminum silicate, mica, glass, silica, such as diatomaceous earth, fumed silica, sand, crushed quartz, silica aerogel, precipitated silica, fumed silica, and carbon black or graphite. The preferred fillers for use in the convertible organopolysiloxanes are finely divided silica and finely divided copper.

In addition to fillers in their natural state, the fillers can also be treated with an organosilicon compound prior to incorporation into the silicone rubber. Thus, the fillers can be tretaed with organochlorosilane such as trimethylchlorosilane and mixtures of trimethylchlorosilane, dimethyldichlorosilane and monomethyltrichlorosilane. Furthermore, such fillers can be treated with various liquid silicones, such as dimethylpolysiloxane linear fluids and cyclic materials. Fillers are usually present in an amount of from 20 to 200 parts by weight per 100 parts of convertible organopolysiloxane.

In order to prevent the build-up of structure in compositions within the present invention which contain highly reinforcing silica fillers, it is also convenient to add various plasticizers, such as diphenylsilanediol, to the silicone rubber compounds. Such plasticizers are generally employed in an amount equal to from about 2 parts to 10 parts per 100 parts by weight of the convertible organopolysiloxane.

The peroxides which are employed as cross-linking agents include all of the conventional organoperoxide materials including benzoyl peroxide, dibenzoyl peroxide, 2,4-dichlorobenzoyl peroxide, di-alpha-cumyl peroxide, etc. Such organoperoxide vulcanizing agents are employed in an amount equal to about 0.1 to 5 parts peroxide per 100 parts by weight of the convertible organopolysiloxane.

To cure the silicone rubber compositions of the present invention, they are heated at a temperature sufficiently high to cause decomposition of the peroxide. The particular curing temperature and time is a function of the particular material involved. For many applications, a cure in a mold at a temperature of 170° C. under a pressure of 1,000 p.s.i. for 15 minutes, followed by a post-cure at 150° C. to 200° C. for 2 hours provides optimum cure characteristics.

The following examples are illustrative of the practice of my invention and are not intended as limitations. All parts are by weight.

The pentamethyl - gamma - trifluoroacetamidopropylcyclotrisiloxane employed in the examples were prepared by first adding 142 parts ethyltrifluoroacetate dropwise to 57 parts of allylamine over a period of two hours. The heat of the reaction kept the temperature of the reaction mixture at 45 to 50° C. The reaction mixture was stirred for one hour and allowed to stand for 16 hours and distilled to produce 43.4 parts of a liquid at 75–86° C. which consisted mostly of ethanol. The residue was fractionally distillted to give 137.6 parts of N-allyltrifluoroacetamide boiling at 30 to 34° C. at 1 mm. Then 76.6 parts of N-allyltrifluoroacetamide was added over a period of 30 minutes to 57.5 parts of methyldichlorosilane and 0.5 part chloroplatinic acid hexahydrate. The reaction mixture was heated for two hours and fractionally distilled to produce methyl - gamma - trifluoroacetamidopropyldichlorosilane, which boiled at 133 to 135° C. at 8 mm. Analyses for hydrolyzable chlorine showed the presence of 25.0% as compared with the theoretical value of 26.4%. The cyclotrisiloxane was prepared by making up two solutions, the first of which contained 268.2 parts of methyl - gamma - trifluoroacetamidopropyldichlorosilane dissolved in 900 parts toluene, the second of which contained 166.3 parts of tetramethyldisiloxane-1,3-diol and 125 parts pyridine in 700 parts toluene. Both solutions were added simultaneously and at the same rate to a third solution containing 64 parts pyridine in 1800 parts toluene over a 2½ hour period. The reaction mixture was allowed to stand for 16 hours, a precipitate was filtered, the filtrate was washed three times with water to remove any remaining pyridine hydrochloride, the resulting solution was dried, filtered, and solvent was evaporated. The residue was sublimed in vacuum followed by recrystallization from hexane to produce pentamethyl-gamma - trifluoroacetamidopropylcyclotrisiloxane, which was a white crystalline solid melting at 81 to 82.5° C.

EXAMPLE 1

To a reaction vessel was charged 300 parts of tetramethyl - gamma - trifluoroacetamidopropylcyclotrisiloxane, 3 parts of 2-methyl-2-vinyl-4,4,6,6-tetraphenylcyclotrisiloxane and the reaction mixture was heated to a temperature of 140° C. at which time the reaction mixture was a molten liquid. To this molten stirred solution was added a sufficient amount of a 1% solution of butyl lithium in hexane to provide 0.06 part butyl lithium and the reaction mixture was stirred. By the end of 31 seconds, the reaction mixture had polymerized to a point where the stirrer could not operate. The polymer was then heated at a pressure of 1 to 10 mm. at 140° C. for one hour and was then dissolved in ethyl acetate, decatalyzed by reaction with one part allyl bromide, precipitated from the ethyl acetate solution with hexane, and stripped of solvent. The intrinsinc viscosity of this polymer was 2.42 deciliters per gram when measured in ethyl acetate at 25° C. This polymer consisted essentially of 33 mole percent trifluoroacetamidopropylsiloxane units of Formula 1, 0.23 mole percent methylvinylsiloxane units, and 0.47 mole percent diphenylsiloxane units, with the remaining siloxane units being dimethylsiloxane units. A silicone rubber compound was prepared by milling 100 parts of this polymer with 40 parts of finely divided fumed silica having a surface coating of octamethylcyclotetrasiloxane thereon, 5 parts diphenylsilanediol, and 0.5 part of dialpha-cumyl peroxide. A number of samples of this compound were press-cured in a mold at 170° C. and a pressure of 1,000 p.s.i. for 15 minutes and then post-cured for 2 hours at 150° C. After this cure cycle, the silicone rubber had a tensile strength of 1,225 p.s.i. and an elongation of 490%. After 5 hours in toluene at room temperature, this rubber showed a weight gain of only 23%. After 24 hours in a mixed fuel consisting of 30 parts toluene and 70 parts isooctane, the swell was only 19%. After 24 hours in isooctane, the swell was 11%. In order to evaluate the resistance of this material to more rigorous conditions, it was maintained for 70 hours in boiling water at which time the tensile strength was 780 p.s.i. with 325% elongation. After 70 hours in refluxing mixed fuel, the rubber had a tensile strength of 990 p.s.i. and an elongation of 425%. The limited swell in the mixed fuel and in the isooctane at room temperature, together with the resistance to boiling water and boiling mixed fuel, shows the outstanding hydrolytic and thermal stability of this material and its solvent resistance.

EXAMPLE 2

A polymer identical in chemical composition to the polymer prepared in Example 1 was prepared by the same technique and had an intrinsic viscosity of 1.98 deciliters per gram, when measured as above. A silicone rubber compound was prepared from a portion of this material by milling 100 parts of the polymer with 50 parts of finely divided fumed silica, 5 parts diphenylsilanediol, 5 parts iron oxide, and 0.5 part di-alpha-cumyl peroxide. Samples of this compound were cured for 15 minutes at 170° C. under 1,000 p.s.i. and then post-cured for 2 hours at 200° C. The initial tensile strength of this material was 900 p.s.i. with an elongation of 140%. After further aging for 24 hours at 200° C., the tensile was 700 p.s.i. with a 100% elongation. A sample was immersed in boiling water and after 70 hours had a tensile of 680 p.s.i. and an elongation of 160%. After immersion for 70 hours in the mixed fuel, a sample of the rubber had a tensile strength of 355 p.s.i. and an elongation of 70%.

EXAMPLE 3

A portion of the polymer of Example 2 was used to formulate a silicone rubber from 100 parts of the polymer, 10 parts of a ground quartz, 40 parts of finely divided fumed silica, 5 parts diphenylsilanediol, 5 parts iron oxide and 0.5 part di-alpha-cumyl peroxide. This was cured as in the preceding example. The initial strength of this material was 1,420 p.s.i. with an elongation of 215%. After aging for 24 hours at 200° C., the material had a tensile strength of 600 p.s.i. and an elongation of 15%. The properties after 70 hours in boiling water were 810 p.s.i. and 140% elongation. After 70 hours in the boiling mixed fuel, the tensile strength was 1,130 p.s.i. with 180% elongation.

EXAMPLE 4

The procedure of Example 1 was repeated to produce a polymer identical in chemical composition to the polymer of Example 1, but with an intrinsic viscosity of 1.00 deciliters per gram when measured in ethyl acetate at 25° C. A silicone rubber compound was prepared by milling 100 parts of this polymer with 40 parts of finely divided fumed silica, 5 parts diphenylsilanediol, 5 parts iron oxide, and 0.5 part di-alpha-cumyl peroxide. After curing this rubber under the conditions of Example 2, the resulting material had a tetnsile strength of 1,450 p.s.i. with an elongation of 300%. After aging for 72 additional hours at 200° C., the tetnsile strength was 1,125 p.s.i. with an elongation of 190%. After 24 hours at room temperature in toluene, this material showed a weight gain of only 24%. After 24 hours in the mixed fuel at room temperature, the weight gain was only 16%.

EXAMPLE 5

This example illustrates the preparation of a polymer similar to those of the preceding examples except with chlorine atoms in place of the fluorine atoms of the polymers of the present invention. In particular, the procedure of Example 1 was followed by reacting 300 parts of pentamethyl - gamma-trichloroacetamidopropylcyclotrisiloxane and 3 parts of 2-methyl-2-vinyl-4,4,6,6-tetraphenylcyclotrisiloxane in the presence of 2 parts hexane and heating the mixture to its reflux temperature. At this point, (about 100° C.), a sufficient amount of a 1% hexane solution of butyl lithium was added in an amount sufficient to provide 0.01 part butyl lithium. Within 27 minutes, the stirrer in the reaction vessel was unable to rotate due to the viscosity of the mixture. The mixture was then heated at 120° C. under vacuum for one hour to give a clear polymer having an intrinsic viscosity of 1.83 deciliters per gram and which consisted of approximately 33 mole percent methyl - gamma - trichloroacetamidopropylsiloxane units, 0.28 mole percent methylvinylsiloxane units, and 0.56 mole percent diphenylsiloxane units. The pentamethyl-gamma - trichloroacetamidopropylcyclotrisiloxane had been prepared by the general procedure described above by first reacting N-allyltrichloroacetamide with methyldichlorosilane employing a platinum catalyst to produce methyl - gamma - trichloroacetamidopropyldichlorosilane, which had a boiling point of 177–180° C. at 7 mm. This in turn was reacted with tetraphenyldisiloxane-1,3-diol to produce the cyclic trimer, which melts at 94–95° C. A silicone rubber compound was prepared by milling 100 parts of this polymer with 40 parts finely divided fumed silica, 5 parts diphenylsilanediol, 5 parts iron oxide, and 0.5 part di-alpha-cumyl peroxide. After press-curing at 1,000 p.s.i. for 15 minutes at 170° C., an attempt was made to post-cure the polymer at 200° C. After 30 minutes of heating, the polymer shrunk and became brittle, indicating a complete lack of thermal stability.

EXAMPLE 6

Following the procedure of Example 1, a polymer identical in composition to that of Example 1 was prepared with an intrinsic viscosity of 0.78 deciliters per gram. A number of silicone rubber compositions were prepared from this polymer by milling 100 parts of the polymer with 7 parts iron oxide, 5 parts diphenylsilanediol, 1.5 parts di-alpha-cumyl peroxide, and 40 parts of either carbon black or a mixture of carbon black and finely divided fumed silica. In the table below are listed the parts carbon black, parts silica, the initial tensile strength and elongation, and the tensile strength and elongation after 70 hours in the mixed fuel and after 70 hours in boiling water. In the table, the designation T/E indicates tensile strength and elongation. Data, such as "620/175," refers to 620 p.s.i. and 175% elongation. The heading "T/E, Fuel" is after 70 hours in the boiling mixed fuel. The heading "T/E, Water" is the data after 70 hours immersion in boiling water.

TABLE

| Rubber | A | B | C | D |
|---|---|---|---|---|
| Parts carbon | 40 | 30 | 20 | 10 |
| Parts silica | 0 | 10 | 20 | 30 |
| T/E, initial | 620/175 | 710/180 | 695/155 | 770/155 |
| T/E, solvent | 580/175 | 620/165 | 630/150 | 615/120 |
| T/E, water | 480/180 | 560/180 | 610/145 | 575/135 |

As shown by the above data, all of the compositions containing the silica replaced in part or totally by carbon black also exhibited outstanding solvent resistance and hydrolytic stability, as well as thermal stability. Rubber A was maintained at a temperature of 250° C. for 24 hours and lost only 7% by weight. Even after 5 days, the rubber was still flexible, even though it had lost about 13% of its initial weight. The swellings in toluene for Rubber A after 24 hours at room temperature was 19% and in the mixed fuel after 24 hours was 13%.

EXAMPLE 7

Another polymer made up of the same chemical composition of the polymer of Example 1, except with an intrinsic viscosity of 1.85 deciliters per gram, was converted to a silicone rubber employing the same formulation as Rubber A from Example 6. This cured rubber had an initial tensile strength of 725 p.s.i. and an elongation of 145%. After 70 hours in the boiling mixed fuel, the tensile strength was 605 p.s.i. at an elongation of 130% and after 70 hours in boiling water, had a tensile strength of 530 p.s.i. and an elongation of 150%.

EXAMPLE 8

This example illustrates the preparation and properties of silicone rubber employing a polymer similar to that of Example 1, except that no halogens are present in the substituents of the silicon atoms. Into a reaction vessel was charged 300 parts of pentamethyl-gamma-acetamidopropylcyclotrisiloxane (M.P. 83.5–85° C.), 2 parts of 2-methyl - 2 - vinyl-tetraphenylcyclotrisiloxane and 5 parts toluene. The reaction mixture was refluxed at a temperature of 140° C. and a sufficient amount of a 1% butyl lithium solution in hexane was added to provide 0.2 part butyl lithium. The liquid reaction mixture polymerized within a few seconds and was then maintained at 185° C. for one hour. The resulting polymer was dissolved in dimethylformamide, the catalyst was neutralized as before, and the polymer was precipitated from hexane and found to have an intrinsic viscosity of 1.15 deciliters per gram. This polymer consisted of about 33 mole percent methyl-gamma-acetamidopropylcyclotrisiloxane units, 0.21 mole percent methylvinylsiloxane unit, 0.42 mole percent diphenylsiloxane units, with the remaining units being dimethylsiloxane units. A silicone rubber compound was prepared by mixing 100 parts of this polymer with 40 parts finely divided carbon black, 7 parts iron oxide, 5 parts diphenylsilanediol, and 1.5 parts di-alpha-cumyl peroxide. After only 16 hours at 250° C., the resulting rubber sheet became tile-like and brittle, with a weight loss of 17%, thus illustrating the lack of thermal stability of these polymers.

EXAMPLE 9

To a reaction vessel was charged 360 parts of pentamethyl - gamma - trifluoroacetamidopropylcyclotrisiloxane, 220 parts of hexaphenylcyclotrisiloxane, and 5.8 parts of 2 - methyl - 2 - vinyl - 4,4,6,6 - tetraphenylcyclotrisiloxane and 220 parts of hexamethylcyclotrisiloxane. This mixture was heated to a temperature of 140° C., at which time the reaction mixture was molten and 0.01 part butyl lithium was added as a 1% butyl lithium solution in hexane. After 4 minutes, the reaction mixture was too thick to stir, and after 20 minutes, the reaction mixture was heated under a pressure of 1 to 10 mm. at 140° C. for one hour to produce a high molecular weight gum which was dissolved in butyl acetate, neutralized, and decatalyzed as in the previous examples with methyl iodide and allyl bromide and precipitated with hexane to produce a clear, elastic gum having an intrinsic viscosity of 1.53 deciliters per gram when measured in ethyl acetate at 25° C. This gum consisted of approximately 16.7 mole percent methyl-gamma-trifluoroacetamidopropylsiloxane units, 0.2 mole percent methylvinylsiloxane units, and 0.4 mole percent diphenylsiloxane units. A silicone rubber compound was prepared from this polymer by milling 100 parts of the polymer with 40 parts of finely divided fumed silica, 7 parts iron oxide, 5 parts diphenylsilanediol, and 0.5 part dialpha-cumyl peroxide. After the cure cycle described above, this material had a tensile strength of 1,065 p.s.i. and 280% elongation. After 70 hours in boiling water, this material had a tensile strength of 755 p.s.i. and an elongation of 210%. After 24 hours in the mixed fuel at room temperature, this material exhibited an 18% swell.

The foregoing examples have illustrated many of the embodiments of my invention, which relates broadly to organopolysiloxanes containing silicon-bonded gamma-trifluoroacetamidopropyl groups as the component of a silicone rubber, which leads to a product with a combination of good physical properties, such as tensile strength and elongation, along with hydrolytic stability, resistance against common fuels, and thermal stability. The silicone rubbers of this material are particularly useful in environments wherein a combination of harsh requirements are found. A particularly useful application for products of this invention are in automotive transmission seals, which come into contact with the adverse factors which are best resisted by these compositions.

What I claim as new and desire to secure by Letters Patent of the United States is:

1. An organopolysiloxane convertible to the solid, cured, elastic state having improved solvent resistance, thermal stability and hydrolytic stability which comprises a polydiorganosiloxane having an intrinsic viscosity of at least about 0.75 deciliters per gram and in which polydiorganosiloxane from about 16 to 33 mole percent of the siloxane units have the formula:

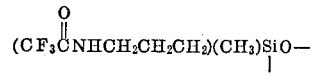

and in which the remaining siloxane units have the formula:

where R is a member selected from the class consisting of monovalent hydrocarbon radicals, halogenated monovalent hydrocarbon radicals and cyanoalkyl radicals, at least about 90 mole percent of the said R groups being methyl radicals.

2. The composition of claim 1 in which the units having the formula:

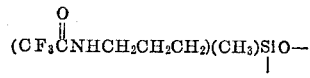

are present in an amount equal to about 33 mole percent.

3. A silicone rubber compound convertible to the solid, cured, elastic state comprising 100 parts by weight of the polydiorganosiloxane of claim 1 and from 20 to 200 parts by weight of a finely divided filler.

4. The composition of claim 3 in which the filler is finely divided silica.

5. The composition of claim 3 in which said filler is finely divided carbon black.

6. The composition of claim 3 to which has been added from 0.1 to 5.0 parts of an organoperoxide vulcanizing agent, per 100 parts by weight of said polydiorganosiloxane.

References Cited

UNITED STATES PATENTS 2,929,829   3/1960   Morehouse.

MORRIS LIEBMAN, Primary Examiner

L. T. JACOBS, Assistant Examiner

U.S. Cl. X.R.

260—46.5